March 10, 1959 G. J. ADAMS 2,876,784
MULTI-STAGE HYDRAULIC GOVERNOR
Filed Jan. 7, 1955
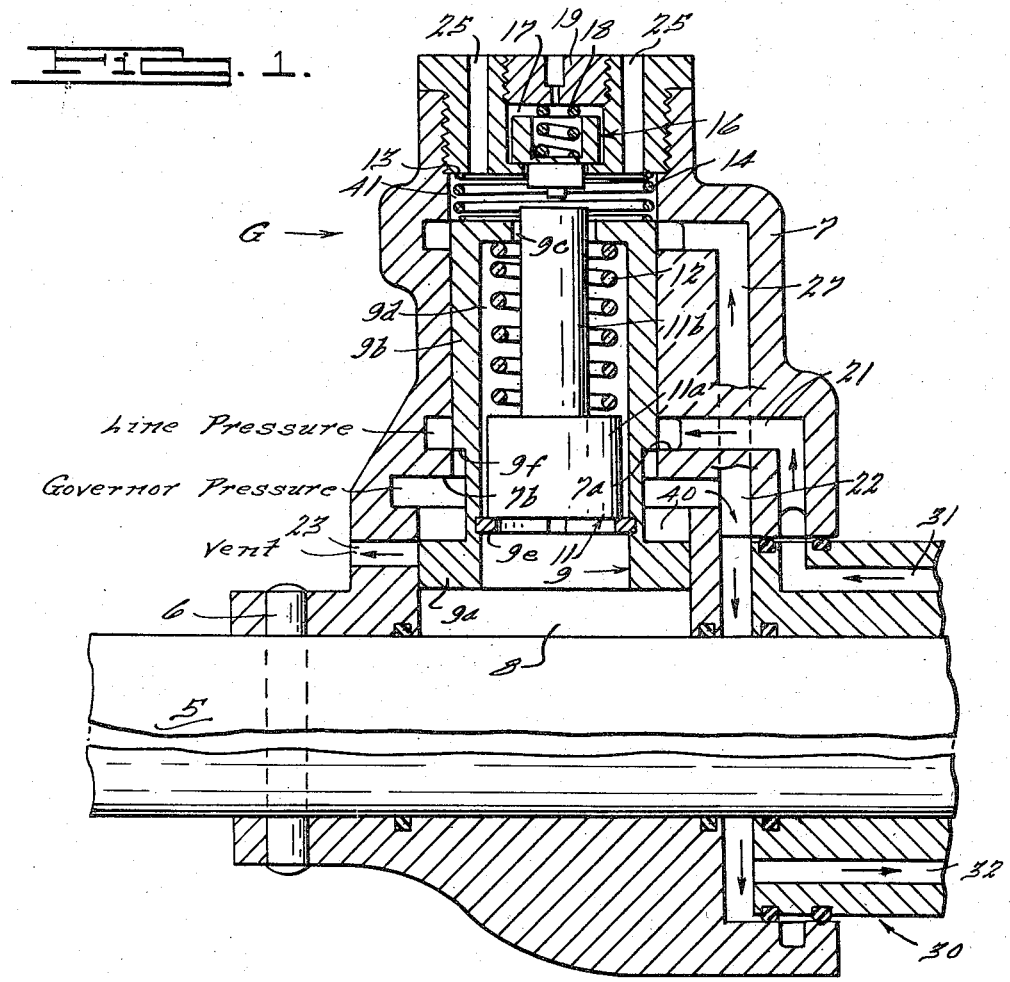
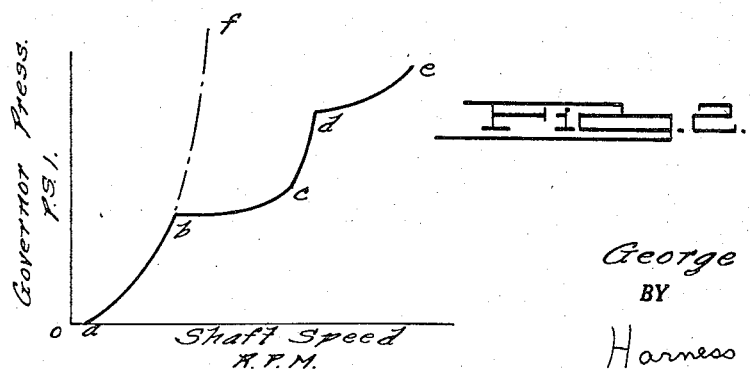
INVENTOR.
George J. Adams,
BY
Harness and Harris
ATTORNEYS.

United States Patent Office 2,876,784
Patented Mar. 10, 1959

2,876,784

MULTI-STAGE HYDRAULIC GOVERNOR

George J. Adams, Detroit, Mich., assignor to Chrysler Corporation, Highland Park, Mich., a corporation of Delaware Application January 7, 1955, Serial No. 480,540

16 Claims. (Cl. 137—56)

This invention relates to a centrifugal force operated hydraulic governor and particularly to a multi-stage hydraulic governor wherein the governor pressure-speed curve is of substantially stair-step configuration and spread out over a relatively wide speed range.

It is a primary object of this invention to provide a simplified form of multi-stage hydraulic governor wherein the pressure regulating valve element of the governor device forms a portion of the centrifugal force operated mass of the governor and is cooperatively arranged with other centrifugal force operated relatively movable masses such that the governor pressure-speed characteristics may be accurately controlled and spread over a relatively wide speed range.

It is another object of this invention to provide an improved form of multi-stage hydraulic governor that is of a simplified construction and that is highly efficient in operation.

It is still another object of this invention to provide a multi-stage hydraulic governor that is particularly adapted for use as a speed responsive control of a hydraulically controlled motor vehicle power transmission unit.

Other objects and advantages of this invention will become readily apparent from a reading of the following description and a consideration of the related drawings wherein:

Fig. 1 is a sectional elevational view of a governor device embodying this invention; and Fig. 2 is a governor pressure-speed curve for the governor device shown in Fig. 1.

In the drawings 5 represents a rotatable shaft to which is drivingly connected by screw means or the like, 6, a centrifugal force operated governor device G. The governor G comprises a valve body 7 that has a radially extending, inverted T-shaped bore 8, formed therein. Reciprocably mounted in the valve body bore 8, for radial movement therein, is a hollow, inverted T-shaped, valve element 9. Valve element 9 includes a head portion 9a that is connected to a stem portion 9b. The outer free end of the valve stem portion 9b is pierced by an aperture 9c to provide an opening through which the stem portion 11b of the inverted T-shaped valve weight 11 extends.

The valve weight 11 is reciprocably mounted in the interior bore 9d of the valve element 9 for conjoint and relative movement with respect thereto. Valve weight 11 includes a head portion 11a that is connected to the valve element 9 through a precompressed, relatively stiff compression spring 12. The spring 12 continuously urges the valve weight 11 towards the split ring seat 9e that is carried by the valve element 9.

Mounted on a seat 13, formed in the outer end of the valve body bore 8, is a relatively light, precompressed, compression spring 14. Compression spring 14 is arranged to continuously resist outwardly directed radial movement of the valve element 9. It is thought to be obvious that at very low rotative speeds of the shaft 5, the valve element 9 may be positioned radially inwardly from the position shown in Fig. 1. Spring 14 not only tends to prevent radial movement of the valve element 9 in an outward direction but, in addition, spring 14 acts to prevent engagement of the free end of the stem portion 11b of valve weight 11 with the valve cushion or plunger 16.

Valve plunger 16 is reciprocably mounted in a bore 17 in the valve body 7 for radial movement with respect thereto. Valve plunger 16 is normally prevented from moving radially outwardly from the position shown in Fig. 1 by the precompressed compression spring 18. Screw 19 provides a means for precompressing the spring 18. It is possible to select a spring 18 such that it need not be initially precompressed and then screw 19 can be omitted.

The valve body 7 is formed with a first pressure fluid inlet 21 to the valve bore 8 and with a second pressure fluid outlet 22 leading from the valve bore 8. Also connected to the valve bore 8, through the valve body 7, is a vent conduit or pressure fluid relief port 23. Piercing the valve body 7 at its outer end so as to intersect the free end of the stem portion of the valve bore 8 are a pair of drain vents 25. The vents 25 prevent the build up of pressure in the outer end of the valve bore 8 and they also permit drainage to sump of any fluid leakage through the governor valve G.

Connected to the valve body 7 is a relatively fixed manifold 30 which has a plurality of conduits 31 and 32 associated therewith. The conduit 31 is arranged to be connected to the valve body pressure fluid inlet conduit 21 so that a substantially constant pressure fluid, herein denoted "line" pressure, can be supplied to the head end of portion 40 of valve bore 8. The conduit 32 is connected to the valve body "governor" pressure outlet conduit 22 so that the pressure fluid that is admitted to the portion 40 of the valve bore 8, through the cracked pressure regulating valve 9, can be conducted by the conduit 32 to the particular pressure fluid operated device (not shown) that is to be responsive to the rotational speed of the shaft 5. The vent conduit 23 in the valve body 7 is arranged so that "governor" pressure fluid in the valve body bore portion 40 may be vented to maintain a condition of equilibrium as to the forces acting on the valve 9 and keep the pressure of the fluid in the bore portion 40 truly responsive to the speed of the shaft 5. This will become more apparent from the subsequent description. A bypass conduit 27 connects the "governor" pressure conduit 22 to the bore portion 41 of the valve bore 8. Bore portion 41 is connected to the drain vents 25. It is thought to be obvious that as the valve element 9 moves radially inwardly, from the position shown in Fig. 1, that it will connect the bore chamber portion 40 with the vent conduit 23 and at the same time the bypass conduit 27 will connect the bore portion 40 to the drain vents 25. This vent structure 23 and 27, 25 will prevent the build up of pressure fluid in the bore portion 40 beyond the pressure necessary to balance the centrifugal force of the rotating, radially movable, parts of the governor device G as described hereafter.

The manner in which the aforedescribed device functions as a hydraulic governor will now be described: The valve body conduit 21 is connected to some source of pressurized fluid which in the case of a motor vehicle power transmission unit is usually a pump driven by the transmission input and/or output shafts. Conduit 21 is thus usually pressurized with a pressure fluid of substantially constant pressure regardless of the operating speed of the associated pump. This pressurized fluid admitted to the fluid supply conduit 21 of valve body 7 is denoted "line" pressure for purposes of this discussion. At very low shaft speeds the valve element 9 will be positioned radially inwardly from the position shown in Fig. 1 and under such circumstances the stem portion 9b of valve 9 closes off the "line" pressure supply conduit 21 and prevents the entry of "line" pressure into the bore chamber portion 40. As the speed of shaft 5 increases centrifugal force acting on the radially movable parts of the governor device G tends to urge the valve 9 radially outwardly to a position wherein the valve stem portion 9f has cleared the edge of the valve casing surface 7a. At this time "line" pressure fluid in conduit 21 can pass into the bore chamber portion 40 through the cracked valve 9 and react on the valve body portion 7b. The radially directed force acting on the valve 9, resulting from the admittance of pressure fluid to the bore portion 40 of valve body 7 tends to urge the valve 9 radially inwardly towards shaft 5 and to thereby close off the pressure fluid supply to bore 40 from the supply conduit 21. However, at the same time that the unbalanced pressure fluid generated force in the bore portion 40 is urging the valve 9 to a position to close off pressure fluid supply to the bore portion 40, there is a simultaneously applied centrifugal force acting on the valve 9, due to rotation of the governor G with the shaft 5, which force tends to move the valve 9 radially outwardly and open the connection of the "line" pressure supply conduit 21 to the bore chamber 40. It will thus be seen that radial movement of the valve element 9 is the resultant of two simultaneously acting, opposed, radially directed forces that cause the valve 9 to function as a pressure regulating valve. The valve 9 reciprocates radially until an equilibrium is established between the forces acting thereon for each speed of the shaft 5. When the several applied forces are in equilibrium then the valve 9 is positioned as shown in Fig. 1. At the time the valve 9 is in equilibrium the pressure of the fluid in bore portion 40 is directly proportional to the speed of the shaft 5 and this pressurized fluid in chamber 40 and conduits 22, 32 is denoted "governor" pressure. This "governor" pressure can be used to operate any sort of shaft speed responsive device.

If the speed of shaft 5 should increase after the valve 9 attains equilibrium then the valve 9 will be temporarily moved outwardly to crack open the "line" pressure supply conduit 21 to the bore portion 40. Upon the admittance of additional pressure fluid to the bore portion 40, due to the movement of the valve 9 to a position opening up the bore 40 to the "line" pressure supply conduit 21, then an increased pressure fluid generated force will be applied to the unbalanced area of the portion 9a of the valve 9 and the valve 9 will be urged radially inwardly until a condition of equilibrium is established for the increased shaft speed. It will be seen that the radially reciprocating valve 9 functions as a pressure regulating or pressure reducing valve to convert the constant intensity "line" pressure in conduit 21 to a speed responsive "governor" pressure in chamber 40 and that the pressure of the fluid trapped in the bore chamber 40 and the discharge conduits 22, 32 is directly proportional to the speed of the shaft 5. If the speed of shaft 5 should be decreased then the centrifugal force that had been urging the valve 9 radially outwardly, in opposition to the radially inwardly directed force applied to valve portion 9a by the "governor" pressure in chamber 40, would be reduced and the valve 9 would move inwardly from the equilibrium position shown in Fig. 1. As a result of valve 9 moving inwardly, the valve portion 9a uncovers the vent conduit 23 and this reduces the pressure of the fluid trapped in bore chamber 40 until another condition of equilibrium is established between the outwardly directed centrifugal force acting on the valve 9 and the inwardly directed force acting on valve 9 that results from the "governor" pressure in bore chamber 40 being applied to an unbalanced area of valve portion 9a. From the foregoing explanation it is thought that it is obvious that the pressure fluid trapped in bore chamber 40 is truly a fluid in which the pressure is directly proportional to the speed of the shaft 5, that is, it is a shaft speed responsive pressure fluid that is frequently denoted "governor" pressure in hydraulic devices of this type.

While the preceding description has been directed to the operation of the pressure regulating valve element 9, it has not taken into consideration the several elements of the governor device G that cooperate with and modify the action of the pressure regulating valve element 9 so that the governor device G functions as a so-called multistage governor of the type having a stair-step pressure-speed curve such as that shown in Fig. 2. At very low speeds it will be noted that the centrifugal force resulting from rotation of the shaft 5 must overcome the combined weight of the valve element 9, the valve weight 11 and the precompressed spring 12. In addition to the mass of the elements 9, 11 and 12 the centrifugal force acting on valve 9 must overcome the radially inwardly directed force exerted by the relatively light weight compression spring 14. Spring 14 in and of itself causes the shift of the origin point of the pressure-speed curve, Fig. 2, from o to a so that there is a zero "governor" pressure at very low speeds of the shaft 5.

During the first stage of operation of the governor device G, the pressure-speed curve is of the shape shown by the portion a to b of Fig. 2. At this time the "governor" pressure in bore chamber 40 is acting on an unbalanced area of the valve portion 9a and this pressure fluid generated force in combination with the force of the relatively light spring 14 is opposing the centrifugal force of the mass 9, 11, 12 such that the valve portion 9f is moved across the valve body "line" pressure inlet port 7a to provide the necessary pressure reducing or pressure regulating action to deliver a shaft speed responsive "governor" pressure fluid to the bore chamber 40 and to the discharge conduits 22, 32.

As the speed of shaft 5 increases, centrifugal force causes the valve weight 11 to move radially outwardly, relative to the valve element 9, and to temporarily seat on the plunger 16. Plunger 16 is supported in the valve body bore 17 by the precompressed, relatively stiff, spring 18. The mass of the valve weight 11 is no longer applied to the valve element 9 so the second stage of the pressure-speed curve, shown by the curve portions b to c, is less inclined or less steep than the first stage curve portion a to b where the mass acting on valve 9 was greater. Seating of the weight 11 on plunger 16 causes a further compression of the spring 12 and this spring force is applied to the valve 9 during the second stage of the governor operation.

It may be that the speed of shaft 5 will continue to increase until the masses of the connected weight 11 and plunger 16 begin to cause a compression of the relatively stiff, precompressed, spring 18. The pressure-speed curve during the time the spring 18 is being compressed is represented by the curve portion c to d in Fig. 2 and this constitutes the third stage of the governor operation. When the plunger 16 seats in the outer end of the bore 17, the weight 11 is permanently seated on the valve body 7 and then the third stage of the governor operation is completed and the mass of the weight 11 is again removed from application to the valve element 9. Spring 12 has been additionally compressed during the outward movement of the plunger 16 and this applies an additional force to the valve element 9 during the third stage of governor operation.

The fourth stage of governor operation is represented by the curve portion d to e. In this stage the weight 11 and plunger 16 are permanently seated on valve body 7 and valve 9 is the movable mass acted on by centrifugal force. Valve 9 is also acted on by the forces exerted by compressed springs 12 and 14.

It is thought to be obvious that the several relatively movable weights and springs 11, 12, 14, 15 and 18 associated with the radially shiftable valve element 9 provide a governor device having a much greater degree of flexibility and control than governors using a single valve weight. It will be noted from the pressure-speed curve shown in Fig. 2 that the governor can operate over a relatively large speed range and as a result governor accuracy is improved. If only a single governor weight were used the pressure-speed curve would be of the type shown by the curve portion a—b—f. The slope of this curve a—b—f is so steep that the governor control is restricted to a relatively small speed range which is unsatisfactory for a large percentage of the installations that would use a governor device of the general type herein disclosed. The improvements incorporated in the governor device herein described render the governor simple and economical to make and install and provide a device for accurate speed control over a wide speed range.

I claim:

1. In a hydraulically operated control system, a governor adapted to be drivingly mounted on a rotatable member comprising a valve body formed with a valve bore extending radially outwardly from said rotatable member, a plurality of relatively movable weights mounted in said bore for conjoint and relative radial movement therein, a valve member mounted in said bore for reciprocating radial movement, resilient means arranged to resist outward radial movement of said valve member, resilient means interconnecting one of said weights and the valve member to resist relative radial movement therebetween, means providing a seat for said one weight on said valve member, resilient means normally supporting a second weight in radially spaced relation to said one weight, said second weight being adapted to be engaged by and to provide a seat for said one weight after a predetermined outward radial movement of said one weight under the influence of centrifugal force, a pressure fluid inlet to said bore and a pressure fluid outlet from said bore, said valve member being arranged in said bore to reciprocate across said pressure fluid inlet and control the admission of pressure fluid to said bore, said valve member being of such a shape as to provide an unbalanced area on which the pressure fluid admitted to said bore acts to urge said valve member radially inwardly in opposition to the outwardly directed centrifugal forces exerted on the valve member due to rotation of said rotatable member, and a vent means connected to said bore and arranged to be controlled by the radial movement of said valve member.

2. In a hydraulically operated control system, a governor adapted to be drivingly mounted on a rotatable member comprising a valve body formed with a valve bore extending radially of said rotatable member, a plurality of relatively movable weights mounted on said valve body for conjoint and relative radial movement, a valve member mounted in said bore for reciprocatory radial movement, resilient means arranged to resist radial movement of said valve member under the influence of centrifugal force, resilient means interconnecting one of said weights and the valve member to resist relative radial movement therebetween, resilient means supporting a second weight in radially spaced relation to said one weight, said second weight being adapted to be engaged by and provide a seat for said one weight after a predetermined relative radial movement between said weights under the influence of centrifugal force, a pressure fluid inlet to said bore and a pressure fluid outlet from said bore, said valve member being arranged in said bore to reciprocate across said pressure fluid inlet and control the admission of pressure fluid to said bore, said valve member being such a shape as to provide an unbalanced area on which the pressure fluid admitted to said bore acts to urge said valve member in a direction opposed to that in which the valve is urged by the centrifugal forces exerted on said valve member due to rotation of said valve body by said rotatable member, and a vent means connected to said bore and arranged to be controlled by movement of the valve member, said vent means providing a means to reduce the pressure of the fluid in said bore when the speed of the rotatable member is reduced.

3. In a hydraulically operated control system, a governor adapted to be drivingly mounted on a rotatable member comprising a valve body formed with a valve bore extending radially of said rotatable member, a plurality of relatively movable weights mounted on said valve body for conjoint and relative radial movement, a valve member mounted in said bore for reciprocatory radial movement, resilient means arranged to resist radial movement of said valve member under the influence of centrifugal force, resilient means interconnecting one of said weights and the valve member to resist relative radial movement therebetween, resilient means supporting a second weight in radially spaced relation to said one weight, said second weight being adapted to be engaged by and provide a seat for said one weight after a predetermined relative radial movement between said weights under the influence of centrifugal force, a pressure fluid inlet to said bore and a pressure fluid outlet from said bore, said valve member being arranged in said bore to reciprocate across said pressure fluid inlet and control the admission of pressure fluid to said bore, said valve member being such a shape as to provide an unbalanced area on which the pressure fluid admitted to said bore acts to urge said valve member in a direction opposed to that in which the valve is urged by the centrifugal forces exerted on said valve member due to rotation of said valve body by said rotatable member, a first vent means connected to said bore controlled by radial movement of said valve member, and a second vent means connected to said valve bore and arranged to prevent pressure build up in said bore that will resist the normal radial movement of said valve member under the influence of centrifugal force.

4. In a hydraulically operated control system, a multi-stage hydraulic governor adapted to be drivingly mounted on a rotatable member comprising a valve body formed with a valve bore extending radially of the rotatable member, a weight mounted on said valve body for radial movement with respect thereto, a valve member mounted in said bore for reciprocating radial movement with respect thereto, resilient means interconnecting said weight and the valve member to resist relative radial movement therebetween, resilient means providing a radially movable seat arranged in radially spaced relation to said weight, said seat being adapted to be engaged by and to provide a seat for said weight after a predetermined radial movement of said weight under the influence of centrifugal force, a pressure fluid inlet to said bore and a pressure fluid outlet from said valve bore, said valve member being arranged in said bore to radially reciprocate across said pressure fluid inlet and control the admission of pressure fluid to said bore, said valve member being of such a shape as to provide an unbalanced area on which the pressure fluid admitted to said bore acts to produce forces urging said valve member in a radial direction opposite to that in which the valve member is urged by the centrifugal forces exerted on the valve member due to rotation of the valve body by said rotatable member, and a vent means connected to said bore and arranged to be controlled by the radial reciprocation of the valve member.

5. In a hydraulically operated control system, a multi-stage hydraulic governor adapted to be drivingly mounted on a rotatable member comprising a valve body formed with a valve bore extending radially of the rotatable member, a weight mounted on said valve body for radial movement with respect to the rotatable member, a valve member mounted in said bore for reciprocatory radial movement with respect thereto, resilient means arranged to resist radial movement of said valve member under the influence of centrifugal force, resilient means interconnecting said weight and the valve member and arranged to resist relative radial movement therebetween, resilient means supporting a seat for said weight in radially spaced relation to the normal position of said weight, said seat being adapted to be engaged by said weight after a predetermined radial movement of said weight under the influence of centrifugal force, a pressure fluid inlet to said bore and a pressure fluid outlet from said bore, the valve member being arranged in said bore to reciprocate across said pressure fluid inlet and control the admission of pressure fluid to said bore, said valve member being of such a shape as to provide an unbalanced area on which the pressure fluid admitted to said bore acts to develop forces that urge said valve member radially in a direction opposite to that in which the valve member is urged by the centrifugal force exerted on the valve member due to rotation of said rotatable member, and a vent means connected to said bore and arranged to be controlled by the radial movement of said valve member.

6. In a hydraulically operated control system, a multistage hydraulic governor adapted to be drivingly mounted on a rotatable member comprising a valve body formed with a valve bore extending radially of the rotatable member, a weight mounted on said valve body for radial movement with respect to the rotatable member, a valve member mounted in said bore for reciprocatory radial movement with respect thereto, resilient means interconnecting said weight and the valve member and arranged to resist relative radial movement therebetween, resilient means supporting a seat for said weight in radially spaced relation to the normal position of said weight, said seat being adapted to be engaged by said weight after a predetermined radial movement of said weight under the influence of centrifugal force, a pressure fluid inlet to said valve bore and a pressure fluid outlet from said valve bore, the valve member being arranged in said bore to reciprocate across said pressure fluid inlet and control the admission of pressure fluid to said bore, said valve member being of such a shape as to provide an unbalanced area on which the pressure fluid admitted to said bore acts to develop forces that urge said valve member radially in a direction opposite to that in which the valve member is urged by the centrifugal force exerted on the valve member due to rotation of said rotatable member, and a vent means connected to said bore and arranged to be controlled by the radial movement of said valve member.

7. In a hydraulically operated control system, a multistage hydraulic governor adapted to be drivingly mounted on a rotatable member comprising a valve body formed with a valve bore extending radially of the rotatable member, a weight mounted on said valve body for radial movement with respect to the rotatable member, a valve member mounted in said bore for reciprocatory radial movement with respect thereto, resilient means interconnecting said weight and the valve member and arranged to resist relative radial movement therebetween, resilient means supporting a seat for said weight in radially spaced relation to the normal position of said weight, said seat being adapted to be engaged by said weight after a predetermined radial movement of said weight under the influence of centrifugal force, a pressure fluid inlet to said valve bore and a pressure fluid outlet from said valve bore, the valve member being arranged in said bore to reciprocate across said pressure fluid inlet and control the admission of pressure fluid to said bore, said valve member being of such a shape as to provide an unbalanced area on which the pressure fluid admitted to said bore acts to develop forces that urge said valve member radially in a direction opposite to that in which the valve member is urged by the centrifugal force exerted on the valve member due to rotation of said rotatable member, and a drain port connected to the valve bore to prevent pressure fluid interference with the movement of the valve member under the influence of the aforementioned forces.

8. In a control system for a mechanism including a rotatable member and a source of pressure fluid, a governor mechanism comprising a valve body having a weight movably mounted thereon and arranged so as to be urged radially outwardly under the influence of centrifugal force, means to permanently seat said weight on said valve body after said rotatable member attains a predetermined speed, a radially extending cylinder bore formed in said valve body, a valve member mounted in said cylinder bore, said valve member having differential pressure areas and being arranged to be moved radially outwardly under the influence of centrifugal force, resilient means connecting said weight to said valve member and resisting movement of said weight relative to said valve member under the influence of centrifugal force, resiliently supported means to engage and provide a temporary seat for said weight after said weight has been moved radially a certain distance under the influence of centrifugal force, a pressure fluid inlet to said cylinder bore and a pressure fluid outlet from said cylinder bore, radial movement of said valve member in said cylinder controlling the pressure of the fluid applied to the differential pressure areas of said valve member, and vent means, controlled by the radial movement of said valve member, connected to said cylinder bore.

9. In a hydraulically operated control system, a governor adapted to be drivingly mounted on a rotatable member comprising a valve body formed with a valve bore extending radially of the rotatable member, a valve member mounted in said bore for reciprocatory radial movement with respect thereto, resilient means arranged to resist outward radial movement of said valve member, a weight mounted on said valve body for outward radial movement under the influence of centrifugal force, resilient means interconnecting said weight and the valve member to resist outward radial movement of the weight relative to the valve member, means adapted to provide a seat for said weight on said valve member as said weight moves radially inwardly relative to said valve member, resilient means supporting a second seat for said weight which second seat is arranged in radially spaced relation to the normal position of said weight, said second seat being adapted to be engaged by and to seat said weight after a predetermined outward radial movement of said weight, a pressure fluid inlet to said valve bore and a pressure fluid outlet from said valve bore, said valve member being arranged in said valve bore to reciprocate radially across said pressure fluid inlet and control the pressure of the fluid admitted to said bore, said valve member being of such a shape as to provide an unbalanced area on which the pressure fluid admitted to said bore acts to produce forces urging said valve member radially inwardly in opposition to the radially outwardly directed centrifugal forces exerted on the valve member due to rotation of said rotatable member, and a vent means connected to said bore and arranged to be controlled by the radial reciprocation of the valve member to control the pressure of the fluid in said bore.

10. In a hydraulically operated control system, a governor adapted to be drivingly mounted on a rotatable member comprising a valve body formed with a valve bore extending radially of the rotatable member, a valve member mounted in said bore for reciprocatory radial movement with respect thereto, a weight mounted on said valve body for outward radial movement under the influence of centrifugal force, resilient means interconnecting said weight and the valve member to resist outward radial movement of the weight relative to the valve member, means adapted to provide a seat for said weight on said valve member as said weight moves radially inwardly relative to said valve member, resilient means supporting a second seat for said weight which second seat is arranged in radially spaced relation to the normal position of said weight, said second seat being adapted to be engaged by and to seat said weight after a predetermined outward radial movement of said weight, a pressure fluid inlet to said valve bore and a pressure fluid outlet from said valve bore, said valve member being arranged in said valve bore to reciprocate radially across said pressure fluid inlet and control the pressure of the fluid admitted to said bore, said valve member being of such a shape as to provide an unbalanced area on which the pressure fluid admitted to said bore acts to produce forces urging said valve member radially inwardly in opposition to the radially outwardly directed centrifugal forces exerted on the valve member due to rotation of said rotatable member, and a vent means connected to said bore and arranged to be controlled by the radial reciprocation of the valve member to control the pressure of the fluid in said bore.

11. In a hydraulically operated control system, a governor adapted to be drivingly mounted on a rotatable member comprising a valve body formed with a valve bore extending radially of the rotatable member, a valve member mounted in said bore for reciprocatory radial movement with respect thereto, a weight mounted on said valve body for outward radial movement under the influence of centrifugal force, means interconnecting said weight and the valve member to resist radial movement of the weight relative to the valve member in one direction, means adapted to provide a seat for said weight on said valve member as said weight moves relative to said valve member in the opposite direction, resilient means providing a second seat for said weight, said second seat being arranged in radially spaced relation to the normal position of said weight, said second seat being adapted to be engaged by and to seat said weight after a predetermined radial movement of said weight under the influence of centrifugal force, a pressure fluid inlet to said bore and a pressure fluid outlet from said valve bore, said valve member being arranged in said bore to reciprocate radially across said pressure fluid inlet and control the pressure of the fluid admitted to said bore, said valve member being of such a shape as to provide an unbalanced area on which the pressure fluid admitted to said bore acts to produce forces urging said valve member radially in a direction opposite to the direction the valve member is urged by the centrifugal forces exerted on the valve member due to rotation of said rotatable member, and a vent means connected to said bore and arranged to be controlled by the radial reciprocation of the valve member to control the pressure of the fluid trapped in said bore.

12. A governor comprising a valve body adapted to be drivingly mounted on a rotatable member, said valve body having a valve bore therein arranged to extend radially of the rotatable member, a valve member mounted in said valve bore for radial movement therein under the influence of centrifugal force, resilient means initially resisting radial movement of the valve member in said valve bore under the influence of centrifugal force, a pressure fluid inlet to said valve bore and a pressure fluid outlet from said valve bore, said valve member being arranged to radially reciprocate across said pressure fluid inlet with variation in rotational speed of said rotational member to control the pressure of the fluid admitted to said valve bore, said valve member and valve bore being arranged such that pressure fluid admitted to said valve bore acts upon an unbalanced area of the valve member to provide a force that resists movement of said valve member under the influence of centrifugal force, vent means connected to said valve bore and arranged to be controlled by the radial reciprocation of said valve member in said bore, a first weight means resiliently connected to said valve member and arranged to be moved relatively thereto under the influence of centrifugal force, seat means to apply and disconnect the mass of said first weight to the mass of said valve member at different rotational speeds of said rotatable member, and a second weight means initially disengaged from said valve member and arranged to have its mass added thereto after a predetermined movement of said first weight means under the influence of centrifugal force.

13. A governor comprising a valve body adapted to be drivingly mounted on a rotatable member, said valve body having a valve bore therein arranged to extend radially of the rotatable member, a valve member mounted in said valve bore for radial movement therein under the influence of centrifugal force, resilient means initially resisting radial movement of the valve member in said valve bore under the influence of centrifugal force, a pressure fluid inlet to said valve bore and a pressure fluid outlet from said valve bore, said valve member being arranged to radially reciprocate across said pressure fluid inlet with variation in rotational speed of said rotational member to control the pressure of the fluid admitted to said valve bore, said valve member and valve bore being arranged such that pressure fluid admitted to said valve bore acts upon an unbalanced area of the valve member to provide a force that resists movement of said valve member under the influence of centrifugal force, vent means connected to said valve bore and arranged to be controlled by the radial reciprocation of said valve member in said bore, a first weight means resiliently connected to said valve member and arranged to be moved relatively thereto under the influence of centrifugal force, seat means to apply and disconnect the mass of said first weight to the mass of said valve member at different rotational speeds of said rotatable member, said last mentioned means comprising a resiliently supported second weight seated on said valve body and initially disengaged from said first weight that is engaged with said first weight after a predetermined radial movement of said first weight under the influence of centrifugal force.

14. In a hydraulically operated control system, a governor adapted to be drivingly mounted on a rotatable member comprising a valve body formed with a valve bore extending radially of the rotatable member, a valve member mounted in said bore for reciprocatory radial movement with respect thereto, resilient means arranged to resist outward radial movement of said valve member, a plurality of weights mounted on said valve body for outward radial movement under the influence of centrifugal force, resilient means interconnecting one of said weights and the valve member to resist outward radial movement of said one weight relative to the valve member, means adapted to provide a seat for said one weight on said valve member as said weight moves radially inwardly relative to said valve member, resilient means supporting a second seat for said one weight which second seat is arranged in radially spaced relation to the normal position of said one weight, said second seat being adapted to be engaged by and to seat said one weight after a predetermined outward radial movement of said one weight, a pressure fluid inlet to said valve bore and a pressure fluid outlet from said valve bore, said valve member being arranged in said valve bore to reciprocate radially across said pressure fluid inlet and control the pressure of the fluid admitted to said bore, said valve member being of such a shape as to provide an unbalanced area on which the pressure fluid admitted to said bore acts to produce forces urging said valve member radially inwardly in opposition to the radially outwardly directed centrifugal forces exerted on the valve member due to rotation of said rotatable member, one or more additional weights connectible to said valve member under the action of centrifugal force, and a vent means connected to said bore and arranged to be controlled by the radial reciprocation of the valve member to control the pressure of the fluid in said bore.

15. A governor comprising a valve body adapted to be drivingly mounted on a rotatable member, said valve body having a valve bore therein arranged to extend radially of the rotatable member, a valve member mounted in said valve bore for radial movement therein under the influence of centrifugal force, resilient means resisting radial movement of the valve member in said valve bore under the influence of centrifugal force, a pressure fluid inlet to said valve bore and a pressure fluid outlet from said valve bore, said valve member being arranged to radially reciprocate across said pressure fluid inlet with variation in rotational speed of said rotational member to control the pressure of the fluid admitted to said valve bore, said valve member and valve bore being arranged such that pressure fluid admitted to said valve bore acts upon an unbalanced area of the valve member to provide a force that resists movement of said valve member under the influence of centrifugal force, vent means connected to said valve bore and arranged to be controlled by the radial reciprocation of said valve member in said bore, a first weight means connected to said valve member and arranged to be moved relatively thereto under the influence of centrifugal force, other weights arranged to have the masses thereof operably connected to said valve member by the action of centrifugal force, and means to apply and disconnect the masses of certain of said other weights to the mass of said valve member at different rotational speeds of said rotatable member.

16. A governor comprising a rotatable valve body having a valve bore therein, a valve in said bore movable by centrifugal force, a first weight connected to said valve by means permitting relative movement therebetween, means to initially resiliently resist movement of said valve by centrifugal force, means to resiliently resist relative movement of said valve and said first weight by centrifugal force, other weight means initially disconnected from said first weight and arranged to have the mass thereof selectively applied to said valve under the influence of centrifugal force after a predetermined movement of said first weight, a pressure fluid inlet to said valve bore controlled by movement of said valve in said valve bore, and a pressure fluid outlet from said valve bore.

References Cited in the file of this patent

UNITED STATES PATENTS

| | | |
|---|---|---|
| 2,406,087 | Mallory | Aug. 20, 1946 |
| 2,697,363 | Sheppard | Dec. 21, 1954 |